United States Patent [19]

Termet

[11] Patent Number: 5,020,257
[45] Date of Patent: Jun. 4, 1991

[54] PERCUSSION SAFETY DEVICE

[75] Inventor: Pierre Termet, Lyon, France

[73] Assignee: Bobet Materiel, Champagne, France

[21] Appl. No.: 472,056

[22] Filed: Jan. 31, 1990

[30] Foreign Application Priority Data

Feb. 3, 1989 [FR] France .................... 89 01416

[51] Int. Cl.⁵ .................... A22B 3/02; F41A 17/76
[52] U.S. Cl. .................... 42/1.12; 42/70.08
[58] Field of Search .................... 42/1.12, 70.08

[56] References Cited

U.S. PATENT DOCUMENTS 1,355,417 10/1920 Pedersen .
3,119,113 1/1964 Bumiller .................... 42/1.12
4,555,861 12/1985 Khoury .................... 42/70.08

FOREIGN PATENT DOCUMENTS 810242 8/1951 Fed. Rep. of Germany .
1228165 11/1966 Fed. Rep. of Germany .
948756 8/1949 France .
1003812 5/1952 France .
2157913 6/1973 France .
2536526 5/1984 France .................... 42/1.12

*Primary Examiner*—Richard W. Wendtland
*Attorney, Agent, or Firm*—Hoffman, Wasson & Gitler

[57] ABSTRACT

The invention relates to an apparatus actuated by the explosion of a cartridge (2), particularly a slaughtering pistol, of the type comprising: a hammer (4) able to slide in a bore between a cocking position and a percussion position where it is in contact with a striker (3); flexible means (5) able to carry hammer (4) from its cocking position to its percussion position; a locking element (6) able to lock hammer (4) in its cocking position as well as in a safety position between the cocking position and the percussion position.

The action of spring (5), which moves hammer (4), stops being exerted at a very small distance before hammer (4) throws striker (3) on cartridge (2) to be struck; and thereby locking element (6) of hammer (4) comprises a stop (10) which is pushed in the direction of hammer (4) and which, in uncocked position, rests against a tapered surface (9) of hammer (4) so as to push the latter constantly by separating it from striker (3) in the direction of the position where percussion spring (5) is stopped by stop (16).

4 Claims, 1 Drawing Sheet

PERCUSSION SAFETY DEVICE

BACKGROUND

This invention relates to a percussion safety device in case of fall of an apparatus actuated by the explosion of a cartridge.

It is known that various types of apparatuses which operate with the explosion of a cartridge are used, such as, for example, the pistols for slaughtering animals.

Such apparatuses can exhibit real dangers during accidental firings such as those which can occur when the apparatus falls to the ground while it is loaded.

Actually, it has been found that, even when the apparatus is not in cocking position and it falls vertically on the end of the barrel, the inertia of the percussion device is sufficient in many cases to fire the cartridge.

Some devices have already been proposed, such as the one described in French patent No. 82 19657, which avoid such firings when the apparatus is not cocked.

SUMMARY OF THE INVENTION

In the device according to this patent, two countersprings are put in motion on the hammer so that it is pushed backward when the percussion has taken place and a new percussion can no longer occur during the fall of the apparatus even if it is not cocked.

This device exhibits, however, the drawback of requiring a perfect balancing of the two countersprings, which is not always easy to achieve. Further, the fatigue of the main percussion spring is such that after a more or less high number of firings, percussion misfires are observed. It is the same for the safety spring which loses its effectiveness and must be replaced.

This invention has as its object a safety device which completely eliminates the above-mentioned drawbacks.

This invention has as its object an apparatus actuated by the explosion of a cartridge, particularly a slaughtering pistol, of the type comprising: a hammer able to slide in a bore between a cocking position and a percussion position where it is in contact with a striker; flexible means able to carry the hammer from its cocking position to its percussion position; and a locking element able to lock the hammer in its cocking position as well as in a safety position between the cocking position and the percussion position, said apparatus being characterized by the fact that the action of the spring on the hammer stops being exerted at a very small distance before the hammer throws the striker on the cartridge to be struck and by the fact that the locking element of the hammer comprises a stop which is pushed in the direction of the hammer and which, in uncocked position, rests against a tapered surface of the hammer so as to push the latter constantly by separating it from the striker, until in the position where the percussion spring begins to exert a stress on the hammer.

In this way, the percussion spring, which can be constantly prestressed, pushes the hammer during the shooting in the direction of the striker until a time which very slightly precedes the moment of the percussion, which is performed thanks to the energy stored by the hammer during its long preliminary travel.

When the percussion has taken place, the stop which is integral with the locking element of the hammer rests against the tapered surface of the hammer while being pushed toward the pin of the latter, which causes a slight movement of the hammer backward to the place where it again comes into contact with the percussion spring.

This device according to the invention assures a safety to the percussion when the apparatus falls on the barrel because the device according to the invention then acts on the hammer to prevent it from actuating the striker by a double action.

First, it is necessary that by the slant of its cone-shaped surface, the hammer compresses the spring of the locking element.

Then, it is necessary that the hammer causes a movement of the locking element which, due to its weight, offers an additional resistance which is added to that of its spring.

BRIEF DESCRIPTION OF THE DRAWING

To better understand the invention, several embodiments taken as example and shown in the accompanying drawing now will be described as illustration and without any limiting nature.

In this drawing.

DESCRIPTION OF THE PREFERRED EMBODIMENT

Figure 1:
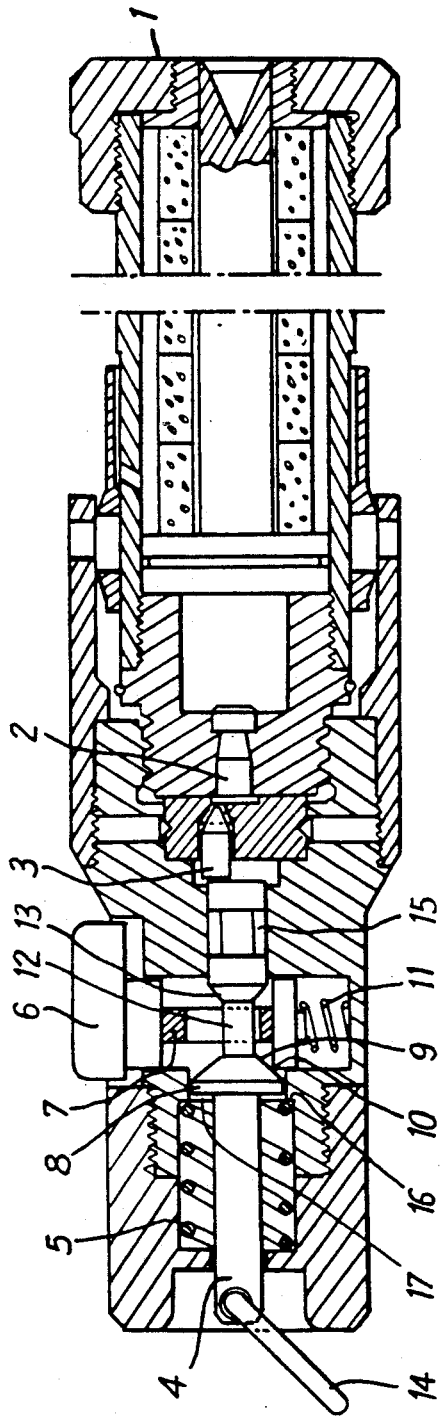
FIG. 1 is a diagrammatic view in section of a slaughtering apparatus comprising a safety device according to the invention.

In FIG. 1, a view in section is seen of a slaughtering apparatus according to the invention of which the end of the barrel is designated by reference 1.

This apparatus comprises, in the known manner, a cartridge chamber in which a cartridge 2 is engaged which is fired by a striker 3 which is actuated to do this by a hammer 4 pushed back by a spring 5.

Locking element 6 slides in a cylindrical orifice which allows it to move vertically in the plane of section of FIG. 1. It comprises a window 7a through which hammer 4 passes.

Successively from the left to the right, the latter comprises a shoulder 8 on which percussion spring 5 acts, and a tapered surface 9 on which rests a stop 10, integral with locking element 6, which is located below window 7 and which is pushed upward by a return spring 11.

The hammer then continues by a cylindrical part 12 of smaller diameter, which is inside window 7, then by a cone-shaped surface 13, which allows it to push the locking element downward when the device is cocked by drawing the hammer backward with cord 14. The hammer then exhibits a groove 15 with front walls which serves to maintain the hammer when the apparatus is cocked, thereby the edges of window 7 fit into this groove 15, as is already known.

In the preferred embodiment of FIG. 1, spring 5 has turns of such a diameter that, on one hand, its right end is stopped by the small stop or shoulder 16, which is made on the breech, and, on the other hand, during the cocking of the apparatus, this spring 5 rests on the inner part of section on shoulder 8 of the hammer, the diameter of the axis of the turns corresponding approximately to that of shoulder 16.

Figure 3:
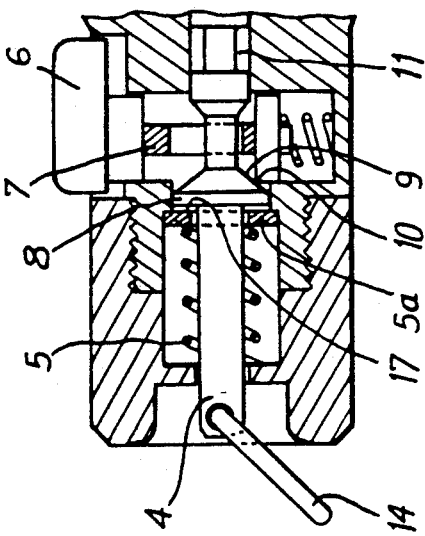
FIg. 3 is a view in partial section corresponding to FIG. 1 of a variant embodiment of the percussion spring.

In a variant shown in FIG. 3, a washer 5a, placed around the rear part of the hammer, is subjected to the action of spring 5 by coming to rest both on shoulder 16 of the breech and on shoulder 8 of the hammer. This arrangement allows a greater tolerance relative to the dimensions of spring 5.

Figure 2:
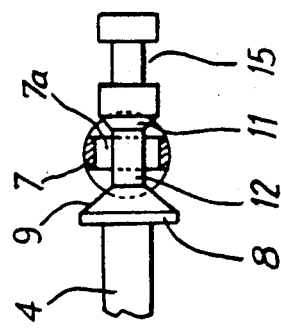
FIg. 2 is a top view corresponding to the part of FIG. 1 which corresponds to the cooperation of the hammer with the locking element.

A diagrammatic top view in horizontal section of FIG. 1 showing the cooperation of window 7 with the locking element and hammer 4 has been shown in FIG. 2.

In this figure, shoulder 8 and cone-shaped part 9 of the hammer are found, as well as cylindrical part 12, which passes inside opening 7a of window 7, while cone-shaped part 13 is connected to the front of a hammer which comprises a groove 15, as is already known, to receive the edges of window 7 of the locking element and to maintain in this way the hammer when the device is cocked.

It therefore is understood that thanks to this mechanism, when the device is in uncocked position, as shown in FIg. 1, the hammer is pushed to the left under the action of stop 10 which, pushed by its spring 11, rests against cone-shaped surface 9.

Thanks to the invention, spring 11 constantly pushes locking element 6 upward, and stop 10, which rests on truncated cone 9, constantly pushes the hammer to the left, which thus is held back from the striker.

As a result, just after firing and from the moment the user stops acting on locking element 6, spring 11, by the slant of stop 10 and cone-shaped surface 9, pushes the hammer to the left, bringing shoulder 8 in the direction of spring 5.

If at that time the loaded but not cocked apparatus falls vertically on its end 1, no percussion can occur because to move to the right and act on striker 3, the hammer must overcome at the same time the resistance of spring 11, the friction of stop 10 on cone 9, and the inertia of locking element 6, which must be pushed downward in FIG. 1, i.e. horizontally when the fall occurs on the front face of the apparatus.

Experience proves that the speeds at which the apparatuses are able to fall on their front ends are not sufficient to impart to the hammer an energy able to overcome all these resistances.

It therefore is seen that the invention makes it possible, in a particularly simple and effective way, to solve the problem of the safety in the percussion of apparatuses of this type.

It is indeed understood that the embodiments which have been described above exhibit no limiting nature and that they will be able to receive any desirable modifications without thereby going outside the scope of the invention.

I claim:

1. An apparatus, actuated by the explosion of a cartridge, comprising:
   a hammer able to slide in a bore of a breech between a cocking position and a percussion position;
   a percussion spring means able to move the hammer from the cocking position to the percussion position;
   a percussion pin pushed by the hammer against the cartridge;
   a spring biased locking element able to lock the hammer in said cocking position as well as in a safety position between the cocking position and the percussion position;
   whereby said apparatus being characterized by the fact that said percussion spring means stops pushing said hammer at a point before said hammer presses said percussion pin against the cartridge to be fired;
   said spring biased locking element comprising a shoulder having an edge which is pushed in the direction of the hammer, and which, in a disarmed situation, rests against a tapered shoulder of the hammer, whereby the hammer rests against said percussion spring means so that the hammer cannot move the percussion pin for firing the cartridge.

2. An apparatus according to claim 1 in which said percussion spring means is a helicoidal spring.

3. An apparatus according to claim 1 wherein an end of said percussion spring means, which is directed to the percussion pin, rests both on a shoulder of the breech and on a shoulder of the hammer.

4. An apparatus according to claim 1 wherein a washer is located on the hammer between an end of the percussion spring means directed toward the percussion pin and a shoulder of the hammer, said washer resting on the shoulder of the breech in a disarmed position of the hammer.

* * * * *